(12) United States Patent
Kamachi et al.

(10) Patent No.: US 7,455,922 B2
(45) Date of Patent: Nov. 25, 2008

(54) ENERGY UTILIZATION APPARATUS AND ENERGY UTILIZATION METHOD

(75) Inventors: Atsushi Kamachi, Wako (JP); Shunsuke Itami, Wako (JP); Hitoshi Okanobori, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 476 days.

(21) Appl. No.: 11/122,930

(22) Filed: May 6, 2005

(65) Prior Publication Data

US 2005/0255350 A1 Nov. 17, 2005

(30) Foreign Application Priority Data

May 12, 2004 (JP) .............................. 2004-141911

(51) Int. Cl.
*H01M 8/04* (2006.01)
*H01M 8/18* (2006.01)
*B01J 7/00* (2006.01)

(52) U.S. Cl. ................................. 429/17; 429/20; 48/61
(58) Field of Classification Search .................. 429/17, 429/20; 48/61
See application file for complete search history.

(56) References Cited

U.S. PATENT DOCUMENTS

| 4,522,894 A * | 6/1985 | Hwang et al. | 429/17 |
| 4,532,192 A * | 7/1985 | Baker et al. | 429/19 |
| 4,581,339 A * | 4/1986 | Bhatt et al. | 502/38 |
| 5,669,216 A * | 9/1997 | Ankersmit et al. | 60/778 |

FOREIGN PATENT DOCUMENTS

EP 1081780 A2 * 3/2001
JP 1-25972 B2 5/1989

* cited by examiner

*Primary Examiner*—Dah-Wei Yuan
*Assistant Examiner*—Alexander Chuang
(74) *Attorney, Agent, or Firm*—Arent Fox LLP

(57) ABSTRACT

An energy utilization apparatus includes: an endothermic reaction device for performing dehydrogenation endothermic reaction of an organic compound; a compression device for pressurizing a first gas containing hydrogen and a dehydrogenated organic compound, and a non-reacted organic compound which are produced in the endothermic reaction device; a distillation device for distilling under pressure the first gas which is pressurized by the compression device, so as to separate the hydrogen and the dehydrogenated organic compound from the liquefied non-reacted organic compound; a vaporization device for vaporizing the liquefied non-reacted organic compound by pressure-relieving; and an expansion energy recovery device for obtaining power of the compression device by using expansion force generated by the vaporization.

12 Claims, 1 Drawing Sheet

ENERGY UTILIZATION APPARATUS AND ENERGY UTILIZATION METHOD

BACKGROUND OF THE INVENTION

1. Field of the Invention

The present invention relates to an apparatus for generating electric power by a fuel cell reaction by using heat generated in the fuel cell, exhaust heat from factories, or solar energy, and relates to a method therefor.

2. Description of the Related Art

A higher-order utilization system in which electric power is generated by using heat discharged from factories or refuse incinerators is known. A heat energy utilization system is disclosed as a system of this type in Japanese Patent Application Publication No. Hei 1-25972 (hereinafter referred to simply as "Document D1"). The heat energy utilization system has first to third processes. In the first process, organic compounds are dehydrogenated by an action of a dehydrogenation catalyst by using heat from an appropriate heat source such as factory exhaust heat. In the second process, unsaturated organic compounds and hydrogen which are produced by the dehydrogenation reaction in the first process are separated from a non-reacted material. In the third process, the unsaturated organic compounds and the hydrogen which are separated in the second process are reacted by an action of a hydrogenation catalyst, so that energy is generated and the organic compounds which are used as starting materials in the first process are regenerated. In the heat energy utilization system, the first process to the third process are repeated so that energy is obtained by using exhaust heat from the appropriate heat source.

For example, in the above system, electric energy can be obtained by using a method in which the organic compounds and the hydrogen are reacted by the action of the hydrogenation catalyst, for a power generation reaction in the fuel cell.

There are a case in which the secondary obtained heat as described above is expressed as "exhaust heat" which is discharged to the outside and a case in which the secondary obtained heat as described above is expressed as "waste heat" which is not used. In this description, the secondary obtained heat in the above cases is called as "exhaust heat".

However, in the above system, problems are caused in the separation of the unsaturated organic compounds and the hydrogen from the non-reacted materials in the second process.

That is, a distillation separation or a membrane separation may be used as the above separation. In the distillation separation, it is necessary to cool a distillation material in order to distill, and as a result, heat is discharged to the outside of the system (that is, heat is wastefully lost). Due to this, the distillation separation is undesirable from the point of view of effective heat utilization.

On the other hand, in the membrane separation, it is necessary that a partial pressure of hydrogen at a permeation side be reduced in order to secure the separation efficiency. Due to this, it is necessary to use a vacuum pump or to flow a large amount of purging gas. However, in the case in which the vacuum pump is used, energy consumption by the vacuum pump causes a problem, and energy consumption causes a problem in the case in which the purging gas is flowed.

As described above, in the system disclosed in the Document D1, although the organic compound and the hydrogen are obtained by the exhaust heat, it is necessary to discharge the heat in the separation thereof, or to supply the energy from the outside. Due to this, the efficiency of the system is decreased.

SUMMARY OF THE INVENTION

Therefore, objects of the present invention are to solve the above problems and to provide a technique which can yield electric energy at high efficiency by using exhaust heat.

The present invention provides an energy utilization apparatus including an endothermic reaction device for performing dehydrogenation endothermic reaction of an organic compound; a compression device for pressurizing a first gas containing hydrogen and a dehydrogenated organic compound, and a non-reacted organic compound which are produced in the endothermic reaction device; a distillation device for distilling under pressure the first gas which is pressurized by the compression device, so as to separate the hydrogen and the dehydrogenated organic compound from the liquefied non-reacted organic compound; a vaporization device for vaporizing the liquefied non-reacted organic compound by pressure-relieving; and an expansion energy recovery device for obtaining power of the compression device by using expansion force generated by the vaporization.

In the present invention, the energy utilization apparatus preferably includes a heat conduction device for using condensation heat generated in the liquefaction for the vaporization of the non-reacted organic compound. In the above feature, when the non-reacted organic compound separated by the liquefaction can be effectively vaporized by using the condensation heat generated in the liquefaction, the energy can be used effectively in the apparatus.

The heat conduction device can be structured such that the heat (condensation heat) generated in the distillation device can be effectively conducted to the vaporization device in which the non-reacted organic compound is vaporized by pressure-relieving therein. Alternatively, the heat conduction device can be structured such that the heat generated in the distillation device is conducted to an appropriate heat transport medium, and the heat is transported to the vaporization device via the heat transport medium.

The energy utilization device of the present invention preferably includes a separation device for separating the hydrogen from the dehydrogenated organic compound; and a fuel cell for generating electricity by using the hydrogen and the dehydrogenated organic compound which are separated by the separation device. In this feature, the hydrogen and the dehydrogenated organic compound which are separated by the distillation can be separated from each other by the separation device, and the fuel cell can generate electricity by using the hydrogen and the dehydrogenated organic compound as reaction materials, which are separated from each other.

Generally, in distillation of a mixture of materials, a portion of the materials is selectively condensed, the other portion of the materials is vaporized by using the difference in the boiling points thereof, and the condensed portion of the materials and the vaporized portion of the materials are separated from each other. In this case, it is necessary to perform distillation under conditions in which the portion of the materials is condensed. In every material, the boiling point thereof decreases as the pressure of the atmosphere decreases, and the boiling point thereof increases as the pressure of the atmosphere increases.

The present invention can use the above point of view, and since the liquefaction of the non-reacted dehydrogenated organic compound can be performed at higher temperatures by pressurizing the first gas, the condensation heat can be effectively used for vaporizing the liquid non-reacted organic compound, and the vaporization of the liquid non-reacted organic compound and the expansion caused thereby can be effectively performed. As a result, the expansion energy can be recovered and can be supplied to the compression device, so that the energy for pressurizing the first gas can be obtained. The vaporized organic compound can be returned to the endothermic reaction device, and the process for obtaining the first gas by using the exhaust heat can be repeated.

That is, the cycle can be realized such that the dehydrogenation endothermic reaction of an organic compound is performed by using the exhaust heat so that the first gas is obtained from the organic compound. The first gas can be pressurized so that the condensation heat is effectively generated in the distillation and separation process of the non-reacted organic compound. The condensation heat can be effectively used for the vaporization process of the non-reacted organic compound separated by the liquefaction. The above pressurization can be performed by using the expansion energy generated by the vaporization, and the organic compound in which the expansion energy is released can be reused in the first dehydrogenation endothermic reaction of the organic compound. In this cycle, the greatest amount of heat obtained from the exhaust source can used, and while the energy supplied from the outside is as small as possible, the hydrogen and the dehydrogenated organic compound can be separated from the first gas.

In the fuel cell reaction, the organic compound can be obtained from the hydrogen and the dehydrogenated organic compound which are separated as starting materials, and can be returned to the first dehydrogenation endothermic reaction process, so that the cycle is realized such that the production of the organic compound, the decomposition by using the exhaust heat, the power generation in the fuel cell, and the composition of the organic compound can be repeated in this order.

In the above manner, in the present invention, the amount of heat (latent heat) which is required in change of the material state can be used effectively, so that electric power can be obtained by using the organic compound as the cyclic material and the exhaust heat energy from the exhaust heat source.

If the pressurization of the first gas is not performed in the above cycle, it is necessary to cool the first gas in the distillation. Due to this, the amount of heat obtained from the exhaust heat source is lost. Since the condensation heat generated in the distillation process is low, the vaporization of the non-reacted organic compound by using the condensation heat cannot be effectively performed. Due to this, the cycle for returning the non-reacted organic compound to the endothermic reaction process cannot work. Due to this, if the energy is not supplied from other than the exhaust heat source, the efficiency of the apparatus cannot be ensured, and effective energy use cannot be performed.

In the present invention, an isopropyl alcohol, a cyclohexanol, a cyclohexan, a methylcyclohexane, and a dimethylcyclohexane, etc., can be used as the organic compound.

For example, in a case in which is an isopropyl alcohol (IPA: $(CH_3)_2CHOH$) is used as the organic compound, hydrogen ($H_2$) and acetone (ACE: $CH_3COCH_3$) can be obtained.

The energy utilization apparatus preferably includes a supplying device for supplying an organic compound produced in the fuel cell to the endothermic reaction device. In this feature, a closed system can be constructed in which the organic compound is circulated in the apparatus, and it may be unnecessary to supply other materials, or the amount of the other materials can be small if necessary.

The amount of heat generated in the fuel cell is preferably supplied to the endothermic reaction device by the supplying device. In this feature, the amount of heat provided in the apparatus can be used for the reactions therein.

As described above, according to the present invention, the circulating system is constructed such that the cycle in the order of the organic compound, the hydrogen and the dehydrogenated organic compound, the fuel cell power generating, and the regeneration of the organic compound, is repeated in the system of the apparatus. That is, the heat energy of the exhaust heat is used as the energy source, and the above circulating cycle is continuously repeated in the apparatus, so that electricity can be generated. In particular, the power generation by the above circulating cycle works even when the exhaust heat source has a low grade such that the heat exhaust temperature is not more than about 150 degrees C. Therefore, the amount of heat which was lost due to the low utilization efficiency and the cost problem in the conventional technique can be used effectively.

The present invention can be recognized as an energy utilization method. That is, the present invention provides an energy utilization method including: performing a dehydrogenation endothermic reaction of an organic compound; pressurizing a first gas containing a hydrogen and a dehydrogenated organic compound, and a non-reacted organic compound which are produced in the dehydrogenation endothermic reaction; distilling under pressure the first gas which is pressurized by the pressurizing so as to separate the hydrogen and the dehydrogenated organic compound from the liquefied non-reacted organic compound; vaporizing the liquefied non-reacted organic compound by pressure-relieving; and recovering expansion energy for obtaining power of the pressurizing by using expansion force generated by the vaporizing.

In the energy utilization method, condensation heat generated in the liquefaction is preferably used for the vaporization of the non-reacted organic compound in the vaporizing. The energy utilization method may include: separating the hydrogen from the dehydrogenated organic compound: and generating electricity by using the hydrogen and the dehydrogenated organic compound which are separated by the separating.

For example, a fuel cell, an engine, various kinds of equipment in a factory, a furnace, a blast furnace, an electric furnace, sunlight, geothermal heat, and gas turbine, etc. can be used as the exhaust heat source.

According to the present invention, material gases supplied from the endothermic reaction device to the distillation device are pressurized by the compression device, and the environmental temperature required in the distillation is thereby increased, so that the condensation heat of the non-reacted organic compound produced in the distillation can be used for the vaporization of the non-reacted organic compound.

The hydrogen and the dehydrogenated organic compound are obtained by the distillation under pressure, and are separated from each other. The fuel cell reaction is performed by using the hydrogen and the dehydrogenated organic compound which are separated from each other, so that the power generation can be performed. In this manner, the electric energy can be obtained at high efficiency by using the exhaust heat.

DESCRIPTION OF THE PREFERRED EMBODIMENTS

Outline of Structure of Embodiment

Figure 1:
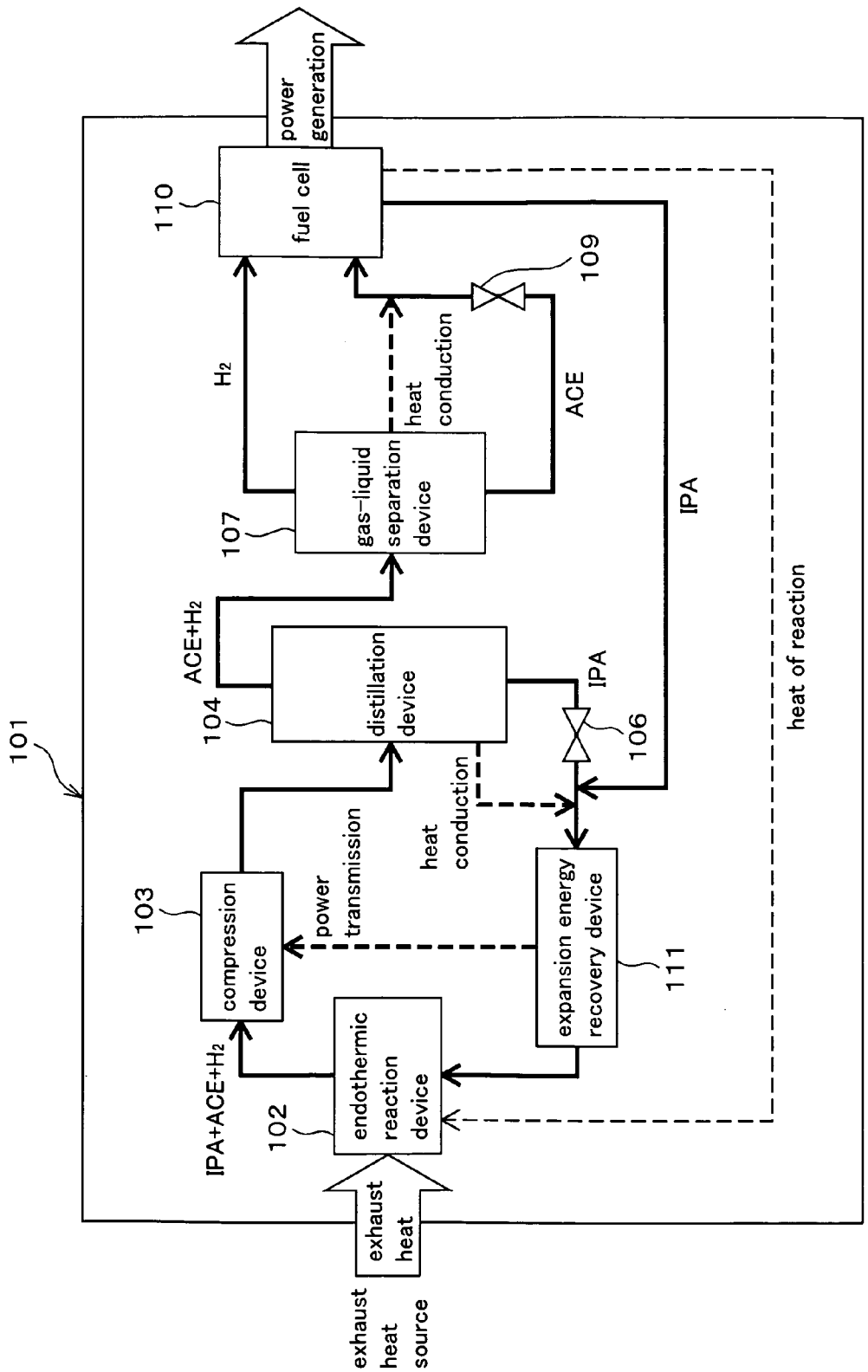
FIG. 1 is a conceptual diagram showing an example of an energy utilization device according to the present invention.

An example of a structure will be described in which hydrogen ($H_2$) and acetone (ACE: $CH_3COCH_3$) which is a dehydrogenated organic compound are obtained by using isopropyl alcohol (IPA: $(CH_3)_2CHOH$) as an organic compound, and electric power is generated in a fuel cell by using the hydrogen and the acetone.

FIG. 1 is a conceptual diagram showing an energy utilization apparatus of the present invention. An energy utilization apparatus 101 shown in FIG. 1 is equipped with an endothermic reaction device 102, a compression device 103, a distillation device 104, an expansion valve 106, a gas-liquid separation device 107, an expansion valve 109, a fuel cell 110, and an expansion energy recovery device 111.

The endothermic reaction device 102 has a dehydrogenation catalyst, absorbs heat supplied from the outside, and decomposes isopropyl alcohol (IPA: $(CH_3)_2CHOH$) into acetone (ACE: $CH_3COCH_3$) and hydrogen ($H_2$).

In the example, an activated carbon having ruthenium (Ru) grains on a surface thereof is used as the dehydrogenation catalyst. A metal, a metallic oxide, or a carbide, etc., can be used as the dehydrogenation catalyst.

The compression device 103 is a pump for compressing so as to pressurize a first gas mainly containing hydrogen and a dehydrogenated organic compound, and a non-reacted organic compound which are obtained from the IPA in the endothermic reaction device 102. The compression device 103 is driven by torque directly transmitted by an expansion energy recovery device 111 described below. A motor (not shown in FIG. 1) as an auxiliary power device is connected to the compression device 103 so as to support the drive of the expansion energy recovery device 111.

The degree of the compression in the compression device 103 is set such that the boiling point of the IPA which is the organic compound is higher than the temperature of the first gas discharged by the endothermic reaction device 102 and the acetone which is the dehydrogenated organic compound is lower than the temperature of the first gas.

For example, in a case in which the temperature of the heat supplied by an exhaust heat source is 120 degrees C., and the temperature of the first gas is 100 degrees C. which is rather lower than the temperature of the heat, the degree of the compression in the compression device 103 is set such that the boiling point of the IPA in the distillation device 104 exceeds 100 degrees C. and the boiling point of the acetone is lower than 100 degrees C.

For example, in a case in which the first gas is compressed at a pressure of 2 atm by the compression device 103, the boiling point of the IPA is increased to be higher than about 100 degrees C. However, since the boiling point of the acetone is higher than about 75 degrees C., the IPA can be liquefied under the conditions that the acetone is maintained in a gas state. Measured data can be used as the boiling points of IPA and the acetone at a predetermined pressure.

The first gas is introduced into the distillation device 104 under pressure, and the distillation device 104 thereby separates the hydrogen and the acetone contained in the first gas as gases and separates the IPA as a liquid contained in the first gas by using the above difference of the boiling points thereof.

The boiling point of the hydrogen is about −253 degrees C. at a normal pressure, the boiling point of the acetone is about 56.5 degrees C. at a normal pressure, and the boiling point of the IPA is about 82.4 degrees C. at a normal pressure. However, in the embodiment of the present invention, as described above, the compression device 103 compresses the first gas to control the boiling point of the acetone to be lower than the temperature of the first gas, and to control the boiling point of the IPA to be higher than the temperature of the first gas.

In the above manner, condensation heat generated from the distillation device 104 can be effectively used for vaporization of the IPA liquefied and separated as described hereinafter. That is, condensation heat generated in distillation is effectively supplied to a vaporization process of the IPA by increasing the distillation point by deliberately pressurizing, and the vaporization process can be effectively executed without energy supply from the outside thereof.

The expansion valve 106 has a function (adiabatic function) for lowering only the pressure of the IPA liquefied and separated in the distillation device 104. The IPA is vaporized and expanded by the expansion valve 106.

Since the temperature of the IPA is decreased in the vaporization and the expansion of the IPA, an amount of heat is supplied to the IPA vaporized and expanded from the distillation device 104, so that the vaporization and expansion thereof is promoted. That is, the condensation heat generated in the distillation device 104 is used for the heat of vaporization of the IPA. In this manner, in distillation of the IPA, it is unnecessary to use excessive energy from the outside of the apparatus 101, and a system having high energy utilization efficiency can be obtained.

Specifically, a pipe for introducing a flow of the IPA from the expansion valve 106 is disposed to be adjacent to a heating portion of the distillation device 104, and a material having a high thermal conductivity is disposed therebetween, so that thermal conductivity can occur effectively therebetween. In this manner, the heat of vaporization of the IPA is supplied from the distillation device 104, and the vaporization and the expansion of the IPA can thereby occur effectively. In distillation of the IPA, it is unnecessary to use excessive energy from the outside of the energy utilization apparatus 101, and a system having high energy utilization efficiency can be obtained.

The IPA vaporized and expanded is introduced to the expansion energy recovery device 111. The expansion energy recovery device 111 recovers the expansion energy of the IPA as kinetic energy (rotational energy), and supplies the expansion energy of the IPA to the compression device 103.

Specifically, the expansion energy recovery device 111 is equipped with a kind of turbine, and this turbine is rotated by the expansion force of the IPA. A shaft of the turbine is connected to a driving shaft of the compression device 103, and the compression device 103 is driven by rotation of the turbine of the expansion energy recovery device 111. In this manner, in the expansion energy recovery device 111, the expansion energy of the IPA is recovered and is used for driving the compression device 103. The power may be converted into electric energy once instead of directly transmitting the power in the above manner.

The gas-liquid separation device 107 separates the hydrogen and the acetone obtained as gases from the upper portion of the distillation device 104. Instead of the gas-liquid separation device 107, a membrane separation device can be used.

That is, in the gas-liquid separation device 107, heat is naturally dissipated from a mixed gas of the acetone and the hydrogen discharged from the distillation device 104, and is cooled to a temperature lower than the boiling point of the acetone. In this manner, the acetone is maintained to have a liquid state, the hydrogen of which the boiling point is very low is maintained to have a gas state, so that the acetone and the hydrogen can be separated from each other. That is, the acetone can be liquefied and be recovered as a liquid from the lower portion of the device 107, and the hydrogen can be recovered from the upper portion of the device 107.

In the expansion valve 109, the acetone liquefied and separated in the gas-liquid separation device 107 is subjected to adiabatic expansion so as to be vaporized, and the driving force for transporting the acetone to the fuel cell 110 is obtained by using the expansion force.

Since the temperature of the acetone is decreased in the adiabatic expansion, an amount of heat is supplied from the gas-liquid separation device 107 to a discharge side of the expansion valve 109, and the vaporization of the acetone is thereby promoted.

The fuel cell 110 is composed of hydrogen and acetone, and generates electric power by the reaction shown in the following Reaction Formula 1.

$CH_3COCH_3 + 2H^+ + 2e^- \rightarrow (CH_3)_2CHOH$   Reaction Formula 1

The fuel cell 110 has stacked unit cell structures in which a separator, a negative electrode, a catalyst layer, a positive electrode, and a separator are stacked in this order. In this structure of the fuel cell 110, the hydrogen is supplied to the positive electrode side, and the acetone is supplied to the negative electrode side.

In the fuel cell 110, the hydrogen and the acetone react in accordance with the above Reaction Formula 1, so that electric power is generated and the IPA ($(CH_3)_2CHOH$) is obtained as a reaction product. The IPA is supplied to the expansion energy recovery device 111, and the kinetic energy thereof is used for the driving energy of the compression device 103. Since the IPA composed in the fuel cell 110 absorbs the heat of reaction, the IPA is returned to the endothermic reaction device 102 via the expansion energy recovery device 111, so that the endothermic reaction can be promoted. In this manner, the heat generated in the apparatus can be effectively used for regenerating electric power without losing the heat.

One Example of Action of Embodiment

An example will be described in which hydrogen ($H_2$) and acetone (ACE: $CH_3COCH_3$) which is a dehydrogenated organic compound are obtained from isopropyl alcohol (IPA: $(CH_3)_2CHOH$) as a organic compound by using exhaust heat from an appropriate heat source, and electric power is generated in a fuel cell by using hydrogen and acetone.

Heat having a temperature of 120 degrees C. is obtained from the exhaust heat source. In this case, in the endothermic reaction device 102, the IPA is decomposed by a dehydrogenation catalyst, so that a first gas containing hydrogen, acetone, and non-reacted IPA is obtained. This first gas is compressed at a pressure of 2 atm by the compression device 103, and is transmitted to the distillation device 104.

Since the inside of the distillation device 104 is pressurized at a pressure of 2 atm by the compression device 103, the IPA can be liquefied at a temperature higher than the boiling point of about 82.4 degrees C. thereof at 1 atm (normal pressure).

For example, in a case in which the first gas is compressed at a pressure of 2 atm, since the boiling point of the IPA exceeds 100 degrees C., the IPA can be liquefied under the conditions in which the temperature of the inside of the distillation device 104 is maintained at 100 degrees C. Since the boiling point of the acetone at a pressure of 2 atm is higher than about 75 degrees C., the acetone is not liquefied, and the hydrogen is not liquefied. Therefore, at a temperature of 100 degrees C., only the IPA can be liquefied, and can be obtained from the lower portion of the device 104, and the hydrogen and the acetone as a gas can be obtained from the upper portion of the device 104.

The pressure of the liquefied IPA is released by the expansion valve 106, and condensation heat generated in liquefaction of the IPA is supplied to the IPA, so that the IPA is vaporized and expanded. This vaporized and expanded IPA is transmitted to the expansion energy recovery device 111, and the expansion energy is recovered therein. That is, the expansion energy of the IPA which is vaporized and expanded is converted into a rotational energy by the rotation of the turbine, etc., in the expansion energy recovery device 111, and the compression device 103 is driven by using the rotational energy. The IPA in a gas state discharged from the expansion energy recovery device 111 is returned to the endothermic reaction device 102, and is reused for endothermic reaction.

On the other hand, a mixed gas of the hydrogen and the acetone discharged from the distillation device 104 is transmitted to the gas-liquid separation device 107, and is cooled to a temperature of 75 degrees C. In this condition, since the hydrogen is in a gas state and the acetone is liquefied, the hydrogen and the acetone can be separated from each other.

The hydrogen and the acetone separated in the gas-liquid separation device 107 are transmitted to the fuel cell 110, and the fuel cell generates electric power by the reaction shown in the Reaction Formula 1. As a result of the reaction shown in the Reaction Formula 1, the IPA is reproduced, the reproduced IPA is transmitted to the expansion energy recovery device 111, and is transmitted to the endothermic reaction device 102 so as to be reused.

In the above manner, the reaction cycle of the IPA, the hydrogen and the acetone, the electric power generation in the fuel cell, and the reproduction of the IPA, can be repeated in the apparatus 101, so that electric power can be generated by using exhaust heat from the appropriate heat source.

The present invention can be applied to an electric power generation system using various exhaust heat.

What is claimed is:

1. An energy utilization apparatus comprising:
   an endothermic reaction device for performing dehydrogenation endothermic reaction of an organic compound;
   a compression device for pressurizing a first gas containing hydrogen and a dehydrogenated organic compound, and a non-reacted organic compound which are produced in the endothermic reaction device;
   a distillation device for distilling under pressure the first gas which is pressurized by the compression device, so as to separate the hydrogen and the dehydrogenated organic compound from the liquefied non-reacted organic compound;
   a vaporization device for vaporizing the liquefied non-reacted organic compound by pressure-relieving; and
   an expansion energy recovery device for obtaining power of the compression device by using expansion force generated by the vaporization,
   wherein the vaporization device has an adiabatic function for lowering only the pressure of the liquefied non-reacted organic compound.

2. The energy utilization apparatus according to claim 1, wherein the apparatus further comprising:
   a separation device for separating the hydrogen from the dehydrogenated organic compound; and
   a fuel cell for generating electricity by using the hydrogen and the dehydrogenated organic compound which are separated by the separation device.

3. The energy utilization apparatus according to claim 2, wherein the apparatus further comprising:

a supplying device for supplying an organic compound produced in the fuel cell to the endothermic reaction device.

4. An energy utilization method comprising:

performing a dehydrogenation endothermic reaction of an organic compound;

pressurizing a first gas containing a hydrogen and a dehydrogenated organic compound, and a non-reacted organic compound which are produced in the dehydrogenation endothermic reaction;

distilling under pressure the first gas which is pressurized by the pressurizing so as to separate the hydrogen and the dehydrogenated organic compound from the liquefied non-reacted organic compound;

vaporizing the liquefied non-reacted organic compound by pressure-relieving; and recovering expansion energy for obtaining power of the pressurizing by using expansion force generated by the vaporizing, wherein the vaporizing uses an adiabatic function for lowering only the pressure of the liquefied non-reacted organic compound.

5. The energy utilization method according to claim 4, wherein condensation heat generated in the liquefaction is used for the vaporization of the non-reacted organic compound in the vaporizing.

6. The energy utilization method according to claim 4, wherein the method further comprising:

separating the hydrogen from the dehydrogenated organic compound; and generating electricity by using the hydrogen and the dehydrogenated organic compound which are separated from each other.

7. The energy utilization apparatus according to claim 2, wherein an organic compound produced in the fuel cell is supplied to a reaction route between the vaporization device and the expansion energy recovery device.

8. The energy utilization method according to claim 4, wherein the vaporizing is performed by using an expansion valve.

9. The energy utilization apparatus according to claim 1, wherein the apparatus further comprising:

a heat conduction device for using condensation heat generated in the liquefaction for the vaporization of the non-reacted organic compound.

10. The energy utilization apparatus according to claim 3, wherein the amount of heat generated in the fuel cell is supplied to the endothermic reaction device by the supplying device.

11. The energy utilization apparatus according to claim 1, wherein the vaporization device is an expansion valve.

12. The energy utilization method according to claim 6, wherein an organic compound produced in the fuel cell is supplied to a reaction route between the vaporizing and the recovering of the expansion energy.

* * * * *